United States Patent
Hwang et al.

(10) Patent No.: US 12,090,978 B2
(45) Date of Patent: Sep. 17, 2024

(54) VEHICLE BRAKING APPARATUS

(71) Applicant: HYUNDAI MOBIS CO., LTD., Seoul (KR)

(72) Inventors: Woo Hyun Hwang, Seoul (KR); Jong Won Park, Seongnam-si (KR); Se Young Cheon, Suwon-si (KR); Hae Chul Lee, Seongnam-si (KR); Pil Jun Kim, Anyang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 281 days.

(21) Appl. No.: 17/736,176

(22) Filed: May 4, 2022

(65) Prior Publication Data
US 2022/0410866 A1 Dec. 29, 2022

(30) Foreign Application Priority Data
Jun. 23, 2021 (KR) .................. 10-2021-0081303

(51) Int. Cl.
*B60T 17/22* (2006.01)
*B60T 7/04* (2006.01)
*B60T 7/06* (2006.01)
*G01B 7/02* (2006.01)
*G01B 7/30* (2006.01)

(52) U.S. Cl.
CPC ............ *B60T 17/221* (2013.01); *B60T 7/042* (2013.01); *B60T 7/06* (2013.01); *G01B 7/02* (2013.01); *G01B 7/30* (2013.01)

(58) Field of Classification Search
CPC .......... B60T 17/221; B60T 7/042; B60T 7/06; B60T 2220/04; B60T 8/3255; B60T 17/22; B60T 13/66; B60T 2270/82; B60T 8/172; B60T 13/74; G01B 7/02; G01B 7/30

See application file for complete search history.

(56) References Cited

FOREIGN PATENT DOCUMENTS

WO WO-2021117889 A1 * 6/2021 ............ B60T 11/103

* cited by examiner

*Primary Examiner* — Jacob M Amick
*Assistant Examiner* — Charles J Brauch
(74) *Attorney, Agent, or Firm* — NovoTechIP International PLLC

(57) ABSTRACT

According to an embodiment, a braking apparatus for a vehicle is advantageous in that this secures the reliability and backup brake performance of a pedal stroke sensor, so that it is possible to prevent a problem in which the brake performance of the vehicle has an error while the vehicle is driving.

9 Claims, 3 Drawing Sheets

VEHICLE BRAKING APPARATUS

CROSS-REFERENCE TO RELATED APPLICATIONS

This application claims priority to and the benefit of Korean Patent Application No. 10-2021-0081303, filed on Jun. 23, 2021, the disclosure of which is incorporated herein by reference in its entirety.

BACKGROUND

1. Technical Field

The present disclosure relates to a braking apparatus for a vehicle.

2. Discussion of Related Art

The content described in this section merely provides the background information on the present disclosure and does not constitute the prior art.

An Electronic Control Unit (ECU) installed in a vehicle properly controls the driving force of each wheel to prevent the vehicle from being spun out by a low-friction road surface during the acceleration, deceleration, or cornering of the vehicle. There are various methods for controlling the driving force, such as a method of distributing a braking force using brake hydraulic pressure or a method of controlling an engine torque.

A braking apparatus to which brake-by-wire technology is applied is advantageous in that a mechanical connection between a brake pedal and a braking-force generator is eliminated and an electric signal is used, so that the braking apparatus has a quick response. However, the elimination of the mechanical connection between the brake pedal and the braking-force generator causes several problems. For instance, if an error occurs in a sensor which detects the depression amount of the brake pedal or an error occurs in a signal transmission unit for transmitting a sensor signal to a controller, the braking apparatus is not operated, thus causing an accident while the vehicle is driving.

SUMMARY

According to at least one aspect, the present disclosure provides a braking apparatus for a vehicle for braking the vehicle based on a depression amount of a brake pedal, the braking apparatus comprising: a first pedal stroke sensor sensing a depression of the brake pedal; a first signal transmission unit and a second signal transmission unit configured to transmit a signal sensed by the first pedal stroke sensor; a primary control unit calculating a first depression amount using the signal received from the first signal transmission unit, and controlling braking of the vehicle; a primary brake unit disposed to receive a control signal from the primary control unit and to supply a braking force to the vehicle; a secondary control unit configured to calculate a second depression amount using the signal received from the second signal transmission unit; a secondary brake unit disposed to receive a control signal from the secondary control unit and to supply a braking force to the vehicle; and a monitoring communication unit configured to transmit and receive information about the first depression amount and the second depression amount between the primary control unit and the secondary control unit.

According to another aspect, the present disclosure provides a braking apparatus for a vehicle for braking the vehicle based on a depression amount of a brake pedal, the braking apparatus comprising: a first pedal stroke sensor and a second pedal stroke sensor sensing the depression amount of the brake pedal; a first signal transmission unit and a second signal transmission unit configured to transmit a signal sensed by the first pedal stroke sensor; a third signal transmission unit configured to transmit a signal sensed by the second pedal stroke sensor; a primary control unit calculating a first depression amount using the signal received from the first signal transmission unit, and calculating a second depression amount using the signal received from the second signal transmission unit, thus controlling braking of the vehicle based on the first depression amount or the second depression amount; a primary brake unit disposed to receive a control signal from the primary control unit and to supply a braking force to the vehicle; a secondary control unit configured to calculate a third depression amount using the signal received from the third signal transmission unit; a secondary brake unit disposed to receive a control signal from the secondary control unit and to supply a braking force to the vehicle; and a monitoring communication unit configured to transmit and receive information about the first depression amount to the third depression amount between the primary control unit and the secondary control unit.

DETAILED DESCRIPTION

Figure 1:
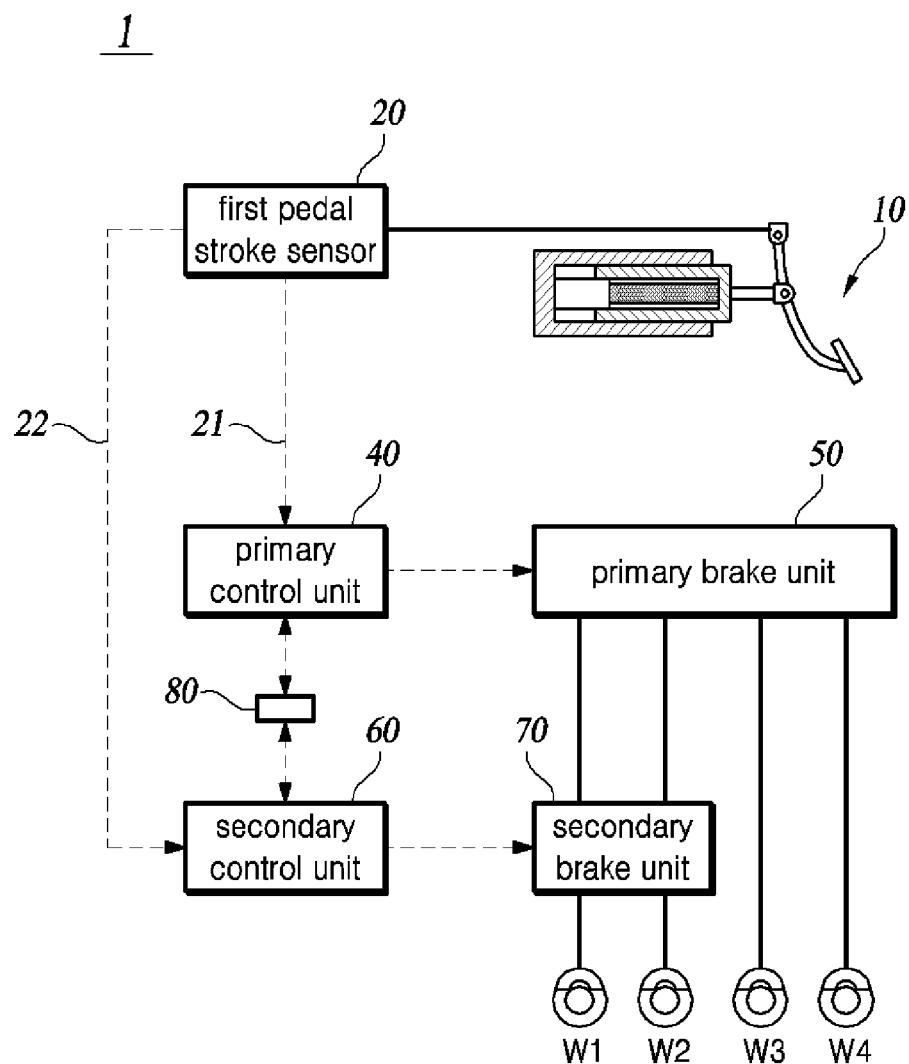
FIG. 1 is a schematic view illustrating a braking apparatus for a vehicle according to a first embodiment of the present disclosure.

In view of the above, a braking apparatus for a vehicle according to an embodiment of the present disclosure includes a backup controller, so that it is possible to improve the stability of the braking apparatus in which brake-by-wire technology is implemented.

A braking apparatus for a vehicle according to an embodiment of the present disclosure realizes the multiplexing configuration of a pedal stroke sensor and a signal transmission unit, so that it is possible to secure the reliability of the pedal stroke sensor.

A braking apparatus for a vehicle according to an embodiment of the present disclosure can secure backup brake performance through failure detection logic of a pedal stroke sensor.

The problems to be solved by the present disclosure are not limited to the above-mentioned problems, and other problems which are not mentioned will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

Figure 2:
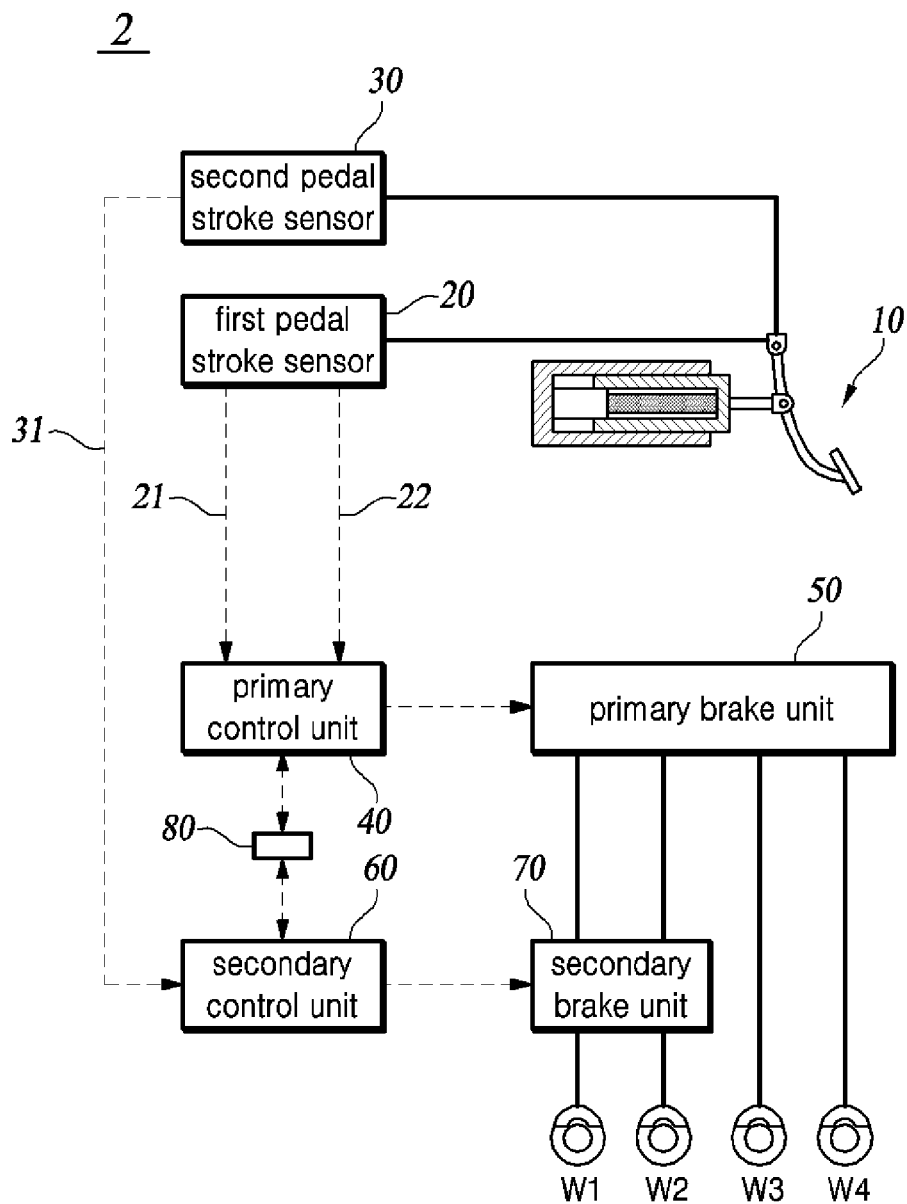
FIG. 2 is a schematic view illustrating a braking apparatus for a vehicle according to a second embodiment of the present disclosure.
Figure 3:
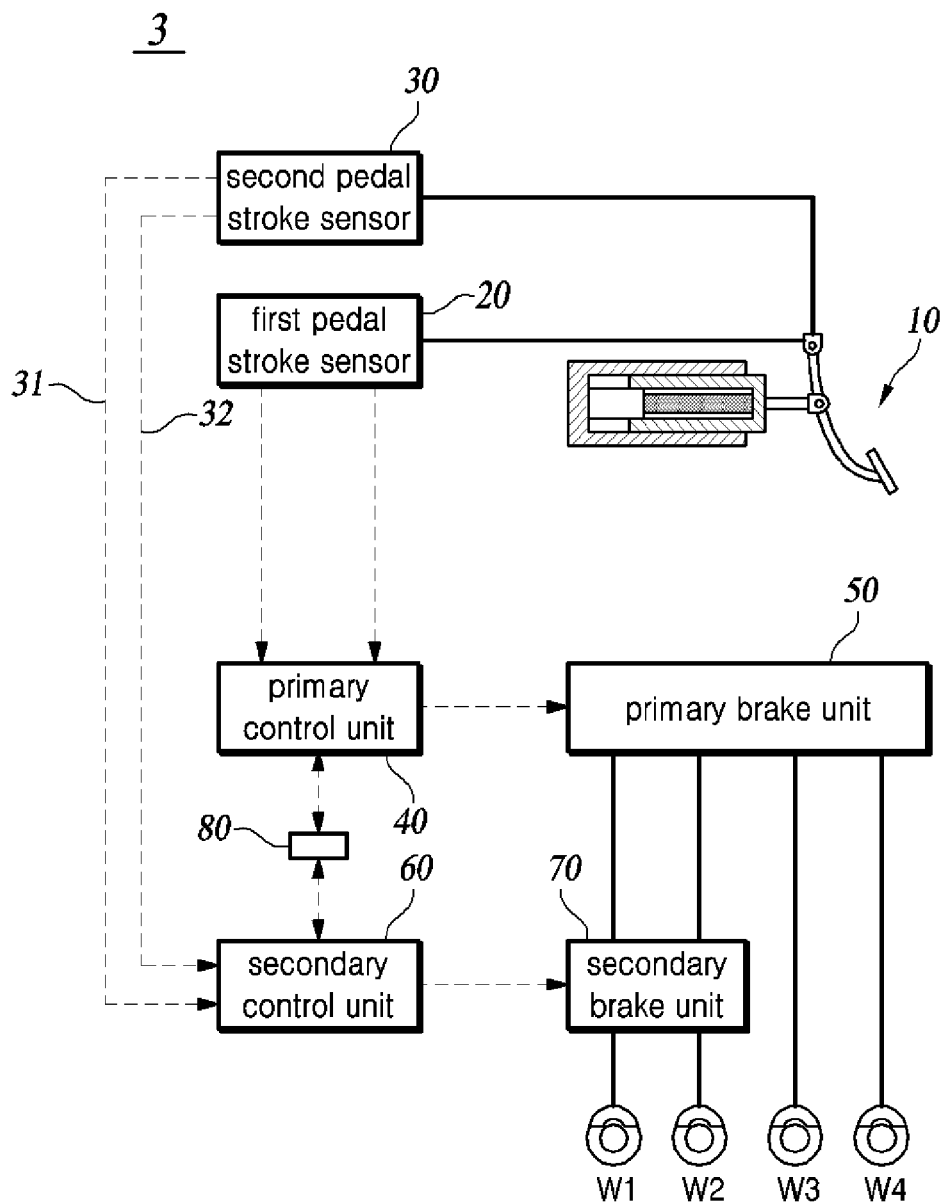
FIG. 3 is a schematic view illustrating a braking apparatus for a vehicle according to a third embodiment of the present disclosure.

FIG. 1 is a schematic view illustrating a braking apparatus for a vehicle according to a first embodiment of the present disclosure. In FIGS. 1 to 3, dotted lines represent the transmission of signals, and solid lines represent the transmission of hydraulic pressure.

Referring to FIG. 1, the braking apparatus for the vehicle according to the first embodiment may include all or some of a first pedal stroke sensor 20, a first signal transmission unit 21, a second signal transmission unit 22, a primary control unit 40, a primary brake unit 50, a secondary control unit 60, and a secondary brake unit 70. The braking apparatus for the vehicle according to the present disclosure may be applied to a brake-by-wire system. However, without being limited thereto, the same may be applied to a case where a mechanical connecting configuration is provided between the brake pedal 10 and a brake unit.

The first pedal stroke sensor 20 detects the depression amount of the brake pedal 10. Information about the depression amount of the brake pedal 10 sensed by the first pedal stroke sensor 20 is transmitted using the first signal transmission unit 21 and the second signal transmission unit 22. The first signal transmission unit 21 and the second signal transmission unit 22 may transmit the signal of the first pedal stroke sensor 20 using Controller Area Network (CAN) communication in the vehicle.

The primary control unit 40 calculates a first depression amount using a signal, containing the information about the depression amount, received from the first signal transmission unit 21. The primary control unit 40 controls the braking of the vehicle. In the case where there is no error in the braking apparatus for the vehicle, the primary control unit 40 may control first to fourth wheel brakes W1, W2, W3, and W4 using the primary brake unit 50. That is, the primary control unit 40 may calculate braking pressure required for each wheel of the vehicle using the first depression amount, and may control the primary brake unit 50 based on the braking pressure to brake the vehicle. The primary brake unit 50 may include a plurality of solenoid valves and a hydraulic circuit, and may also include a hydraulic pump for generating hydraulic pressure. The primary control unit 40 may control the solenoid valve and a hydraulic pump in the primary brake unit 50 to control the braking of the vehicle.

The primary control unit 40 may not necessarily calculate the braking pressure using only the first depression amount but may calculate the braking pressure using the second depression amount which will be described later to control the braking of the vehicle. The primary control unit 40 may be disposed in a space which is physically adjacent to the primary brake unit 50.

The secondary control unit 60 calculates the second depression amount using a signal received from the second signal transmission unit 22. The secondary control unit 60 may control the secondary brake unit 70 to control the first wheel brake W1 and the second wheel brake W2 which are connected to the secondary brake unit 70. The secondary brake unit 70 may be configured to be connected to the hydraulic circuit extending from a portion of the primary brake unit 50. The secondary brake unit 70 may include a plurality of solenoid valves and a hydraulic pump.

The monitoring communication unit 80 may be configured to transmit and receive information about the first depression amount and the second depression amount between the primary control unit 40 and the secondary control unit 60. Further, the primary control unit 40 and the secondary control unit 60 may transmit and receive information about the first and second depression amounts as well as information about the wheel speed of each wheel for securing brake redundancy, the sensor signal, the status of each controller, etc. using the monitoring communication unit 80.

The braking apparatus 1 for the vehicle according to the first embodiment may secure the redundancy of the braking apparatus using the signal transmission unit connected to the first pedal stroke sensor 20 and the monitoring communication unit 80 connected between the primary control unit 40 and the secondary control unit 60. This will be described below in detail.

When an error occurs in any one of the first signal transmission unit 21 and the second signal transmission unit 22, the primary control unit 40 may control the braking of the vehicle using the signal of a normally operating signal transmission unit among the first signal transmission unit 21 and the second signal transmission unit 22. The primary control unit 40 may determine whether an error occurs in the first signal transmission unit 21, and the secondary control unit 60 may determine whether an error occurs in the second signal transmission unit 22. The primary control unit 40 and the secondary control unit 60 may transmit and receive information about the status of the first signal transmission unit 21 and the second signal transmission unit 22 using the monitoring communication unit 80. To be more specific, when the primary control unit 40 determines that the error occurs in the first signal transmission unit 21, the first depression amount calculated using the first signal transmission unit 21 is not used to control the braking. The primary control unit 40 may receive, from the monitoring communication unit 80, the second depression amount calculated based on the signal received from the second signal transmission unit 22 by the secondary control unit 60 to control the primary brake unit 50 based on the second depression amount. Further, if it is determined that an error occurs in the second signal transmission unit 22 even when the secondary control unit 60 has a control right in vehicle braking, the primary control unit 40 may receive, from the monitoring communication unit 80, the first depression amount calculated using the signal received from the first signal transmission unit 21 to control the secondary brake unit 70.

The braking apparatus 1 for the vehicle according to the first embodiment may further include a hydraulic sensor (not shown) which is provided to detect the hydraulic pressure generated by the depression of the brake pedal 10. The hydraulic sensor (not shown) may be disposed to detect the hydraulic pressure of the master cylinder connected to the brake pedal 10.

When the sum of the first depression amount and the second depression amount is out of a normal range, the primary control unit 40 may be set to control braking using the hydraulic sensor (not shown). The primary control unit 40 may receive the second depression amount from the monitoring communication unit 80. The normal range may vary depending on the type of the vehicle, and may be set based on an actual maximum depression amount of each vehicle. When the sum of the first depression amount and the second depression amount is out of the normal range, the primary control unit 40 may determine that an error occurs in the first pedal stroke sensor 20. Therefore, the braking control of the vehicle may be performed by indirectly measuring the depression amount using the hydraulic sensor (not shown) instead of the first pedal stroke sensor 20.

The primary control unit 40 and the secondary control unit 60 may use the monitoring communication unit 80 to determine whether an error occurs in any one of the primary brake unit 50 and the secondary brake unit 70. In general, when there is no error in the braking apparatus for the vehicle, the primary control unit 40 has the control right in vehicle braking. The primary control unit 40 performs braking using the primary brake unit 50. However, when the primary brake unit 50 malfunctions, the control right may be transferred to the secondary control unit 60.

The control right may be transferred from the primary control unit 40 to the secondary control unit 60 when a failure occurs in some of solenoid valves in the primary brake unit 50 or when a failure occurs in the hydraulic pump or the hydraulic motor in the primary brake unit 50. When the failure occurs in the primary brake unit 50, the primary control unit 40 informs the secondary brake unit 70 of the failure using the monitoring communication unit 80. Further, the control right in vehicle braking is also transferred to the secondary control unit 60.

The secondary control unit 60 controls the secondary brake unit 70 to control the braking of the vehicle. When the control right is transferred to the secondary control unit 60, the secondary control unit 60 may control the braking of the vehicle based on the second depression amount calculated based on the signal received from the second signal transmission unit 22. FIG. 1 shows that the secondary brake unit 70 may control the braking pressure of the first wheel brake W1 and the second wheel brake W2. However, without being limited thereto, the secondary brake unit 70 which controls the first to fourth wheel brakes W1, W2, W3, and W4 may be disposed on the braking apparatus for the vehicle.

In general, since the secondary brake unit 70 does not have as much braking performance as the primary brake unit 50, the driving speed limit of the vehicle may be set so as not to exceed a preset speed limit when the control right is transferred from the primary control unit 40 to the secondary control unit 60. Further, it is possible to visually or acoustically inform a driver that a failure occurs in the primary brake unit 50.

Even when the primary control unit 40 has the control right, the secondary control unit 60 may continuously determine whether a failure occurs in any one of the solenoid valve or the hydraulic pump in the secondary brake unit 70.

FIG. 2 is a schematic view illustrating a braking apparatus for a vehicle according to a second embodiment of the present disclosure. A description of components common to both FIGS. 1 and 2 will be omitted.

The braking apparatus 2 for the vehicle according to the second embodiment may include all or some of a first pedal stroke sensor 20, a second pedal stroke sensor 30, a first signal transmission unit 21, a second signal transmission unit 22, a third signal transmission unit 31, a primary control unit 40, a primary brake unit 50, a secondary control unit 60, a secondary brake unit 70, and a monitoring communication unit 80.

Each of the first pedal stroke sensor 20 and the second pedal stroke sensor 30 is disposed to sense the depression amount of the brake pedal 10.

The first signal transmission unit 21 and the second signal transmission unit 22 are configured to transmit the signal sensed by the first pedal stroke sensor 20 to the primary control unit 40. The third signal transmission unit 31 is configured to transmit the signal sensed by the second pedal stroke sensor 30 to the secondary control unit 60.

The primary control unit 40 calculates a first depression amount using a signal received from the first signal transmission unit 21, and calculates a second depression amount using a signal received from the second signal transmission unit 22. The primary control unit 40 may control the braking of the vehicle using at least one of the first depression amount or the second depression amount. That is, the primary brake unit 50 may be controlled.

The secondary control unit 60 calculates a third depression amount using a signal received from the third signal transmission unit 31.

The monitoring communication unit 80 may be configured to transmit and receive information about the first to third depression amounts between the primary control unit 40 and the secondary control unit 60. The primary control unit 40 and the secondary control unit 60 may transmit and receive information about the depression amount as well as information about the wheel speed of each wheel for securing brake redundancy, the sensor signal, the status of each controller, etc. using the monitoring communication unit 80.

When an error occurs in any one of the first signal transmission unit 21 to the third signal transmission unit 31, the primary control unit 40 may control the braking of the vehicle using the signal of a normally operating signal transmission unit among the first signal transmission unit 21 to the third signal transmission unit 31. The primary control unit 40 may receive the status of the third signal transmission unit 31 through the monitoring communication unit 80 from the secondary control unit 60. For example, when the primary control unit 40 controls the primary brake unit 50 using the first signal transmission unit 21, the primary brake unit 50 may be controlled using the signal of the second signal transmission unit 22 or the third signal transmission unit 31 if an error occurs in the first signal transmission unit 21.

When the sum of the first depression amount and the second depression amount is out of a normal range, the primary control unit 40 may control braking using the third depression amount. When it is determined that the sum of the first depression amount and the second depression amount is out of the normal range, the primary control unit 40 may determine that an error occurs in the first pedal stroke sensor 20. Therefore, the secondary control unit 60 may control the primary brake unit 50 using information about the third depression amount transmitted using the monitoring communication unit 80. In other words, the primary control unit 40 may control the primary brake unit 50 based on the third depression amount calculated using the second pedal stroke sensor 30.

The primary control unit 40 and the secondary control unit 60 may use the monitoring communication unit 80 to determine whether an error occurs in any one of the primary brake unit 50 and the secondary brake unit 70. In general, when there is no error in the braking apparatus for the vehicle, the primary control unit 40 has the control right in vehicle braking. The primary control unit 40 performs braking using the primary brake unit 50. However, when the primary brake unit 50 malfunctions, the control right may be transferred to the secondary control unit 60.

FIG. 3 is a schematic view illustrating a braking apparatus for a vehicle according to a third embodiment of the present disclosure.

The braking apparatus for the vehicle according to the third embodiment further includes a fourth signal transmitting unit 32 in the braking apparatus for the vehicle according to the second embodiment. Other components are the same as those of the braking apparatus for the vehicle according to the second embodiment shown in FIG. 2. Therefore, a description of the overlapping configuration will be omitted.

The fourth signal transmission unit 32 may transmit a signal sensed by the second pedal stroke sensor 30 to the secondary control unit 60. The secondary control unit 60 may calculate a fourth depression amount using the signal received from the fourth signal transmission unit 32.

Unlike the second embodiment, according to the third embodiment, when the sum of the first depression amount and the second depression amount is out of a normal range, the primary control unit 40 may control braking using the third depression amount or the fourth depression amount. The primary control unit 40 may control the primary brake unit 50 using any one of the third depression amount and the fourth depression amount. However, without being limited thereto, the primary brake unit 50 may be controlled using the average of the third depression amount and the fourth depression amount.

Furthermore, when the sum of the third depression amount and the fourth depression amount is out of a normal range, the primary control unit 40 may control braking using the first depression amount or the second depression amount. While a control right in vehicle braking is transferred to the secondary control unit 60 and the secondary control unit controls the secondary brake unit 70 based on the third depression amount and the fourth depression amount, braking may be controlled using the first depression amount or the second depression amount if an error occurs in the sum of the third depression amount and the fourth depression amount. The secondary control unit 60 may control the secondary brake unit 70 using any one of the first depression amount and the second depression amount. However, without being limited thereto, the secondary brake unit 70 may be controlled using the average of the first depression amount and the fourth depression amount.

According to an embodiment, a braking apparatus for a vehicle is advantageous in that this secures the reliability and backup brake performance of a pedal stroke sensor, so that it is possible to prevent a problem in which the brake performance of the vehicle has an error while the vehicle is driving.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. An apparatus for braking a vehicle, comprising:
a pedal stroke sensor configured to sense a depression amount of a brake pedal of a vehicle and generate a depression signal indicating the sensed depression amount of the brake pedal;
first and second signal transmission units configured to transmit the depression signal generated by the pedal stroke sensor;
a primary control unit configured to:
   determine a first depression amount based on the depression signal transmitted by the first signal transmission unit; and
   generate a first brake control signal based on the first depression amount;
a primary brake unit configured to:
   receive the first brake control signal from the primary control unit;
   determine a first braking force based on the first brake control signal; and
   apply the first braking force to the vehicle;
a secondary control unit configured to:
   determine a second depression amount based the depression signal transmitted by the second signal transmission unit; and
   generate a second brake control signal based on the second depression amount;
a secondary brake unit configured to:
   receive the second brake control signal from the secondary control unit;
   determine a second braking force based on the secondary brake control signal; and
   apply the second braking force to the vehicle; and
a monitoring communication unit configured to receive the first and second depression amounts from the primary and secondary control units, respectively, and
transmit the received first and second depression amounts to the secondary and primary control units, respectively, and
further comprising a hydraulic sensor configured to sense a hydraulic pressure generated by the depression of the brake pedal,
wherein the primary control unit is further configured to:
   detect that a sum of the first and second depression amounts is not within a predetermined range; and
   brake the vehicle based on the hydraulic pressure sensed by the hydraulic sensor.

2. The apparatus of claim 1, wherein the primary control unit is further configured to:
detect that an error has occurred to one of the first and second signal transmission units; and
brake the vehicle based on the depression signal transmitted by the other of the first and second signal transmission units to which the error has not occurred.

3. The apparatus of claim 1, wherein:
the primary control unit is configured to determine whether an error has occurred to the secondary brake unit using the monitoring communication unit, and
the secondary control unit is configured to determine whether an error has occurred to the primary brake unit using the monitoring communication unit.

4. An apparatus for braking a vehicle, comprising:
a first pedal stroke sensor and a second pedal stroke sensor configured to sense a depression amount of a brake pedal of a vehicle and generate a depression signal indicating the sensed depression amount of the brake pedal;

first and second signal transmission units configured to transmit the depression signal generated by the first pedal stroke sensor;
a third signal transmission unit configured to transmit the depression signal generated by the second pedal stroke sensor;
a primary control unit configured to:
   determine a first depression amount based on the depression signal transmitted by the first signal transmission unit;
   determine a second depression amount based on the depression signal transmitted by the second signal transmission unit; and
   generate a first brake control signal based on the first or the second depression amount;
a primary brake unit configured to receive the first brake control signal from the primary control unit and generate a first braking force for braking the vehicle based on the received first brake control signal;
a secondary control unit configured to determine a third depression amount based on the depression signal transmitted by the third signal transmission unit and configured to generate a second brake control signal;
a secondary brake unit configured to receive the second brake control signal from the secondary control unit and generate a second braking force for braking the vehicle based on the received second brake control signal; and
a monitoring communication unit configured to:
   receive the first and second depression amounts from the primary control unit;
   receive the third depression amount from the secondary control unit;
   transmit the received first and second depression amounts to the secondary control unit; and
   transmit the third depression amount to the primary control unit,
wherein the primary control unit is further configured to:
   detect that a sum of the first and second depression amounts is not within a predetermined range, and
   brake the vehicle based on the third depression amount.

5. The apparatus of claim 4, wherein the primary control unit is further configured to:
   detect that an error has occurred to one of the first, second and third signal transmission units; and
   braking the vehicle based on the depression signal transmitted by another one of the first to third signal transmission units to which the error has not occurred.

6. The apparatus of claim 4, wherein:
   the primary control unit is configured to determine whether an error has occurred to the secondary brake unit using the monitoring communication unit, and
   the secondary control unit is configured to determine whether an error has occurred to the primary brake unit using the monitoring communication unit.

7. The apparatus of claim 4, further comprising a fourth signal transmission unit configured to transmit the depression signal generated by the second pedal stroke sensor,
   wherein the secondary control unit is further configured to determine a fourth depression amount based on the depression signal transmitted by the fourth signal transmission unit.

8. An apparatus for braking a vehicle, comprising:
a first pedal stroke sensor and a second pedal stroke sensor configured to sense a depression amount of a brake pedal of a vehicle and generate a depression signal indicating the sensed depression amount of the brake pedal;
first and second signal transmission units configured to transmit the depression signal generated by the first pedal stroke sensor;
a third signal transmission unit configured to transmit the depression signal generated by the second pedal stroke sensor;
a primary control unit configured to:
   determine a first depression amount based on the depression signal transmitted by the first signal transmission unit;
   determine a second depression amount based on the depression signal transmitted by the second signal transmission unit; and
   generate a first brake control signal based on the first or the second depression amount;
a primary brake unit configured to receive the first brake control signal from the primary control unit and generate a first braking force for braking the vehicle based on the received first brake control signal;
a secondary control unit configured to determine a third depression amount based on the depression signal transmitted by the third signal transmission unit and configured to generate a second brake control signal;
a secondary brake unit configured to receive the second brake control signal from the secondary control unit and generate a second braking force for braking the vehicle based on the received second brake control signal; and
a monitoring communication unit configured to:
   receive the first and second depression amounts from the primary control unit;
   receive the third depression amount from the secondary control unit;
   transmit the received first and second depression amounts to the secondary control unit; and
   transmit the third depression amount to the primary control unit;
a fourth signal transmission unit configured to transmit the depression signal generated by the second pedal stroke sensor,
wherein the secondary control unit is further configured to determine a fourth depression amount based on the depression signal transmitted by the fourth signal transmission unit, and
wherein the primary control unit is further configured to:
detect that a sum of the first and second depression amounts is not within a predetermined range; and
brake the vehicle based on the third or fourth depression amount.

9. An apparatus for braking a vehicle, comprising:
a first pedal stroke sensor and a second pedal stroke sensor configured to sense a depression amount of a brake pedal of a vehicle and generate a depression signal indicating the sensed depression amount of the brake pedal;
first and second signal transmission units configured to transmit the depression signal generated by the first pedal stroke sensor;
a third signal transmission unit configured to transmit the depression signal generated by the second pedal stroke sensor;

a primary control unit configured to:
- determine a first depression amount based on the depression signal transmitted by the first signal transmission unit;
- determine a second depression amount based on the depression signal transmitted by the second signal transmission unit; and
- generate a first brake control signal based on the first or the second depression amount;

a primary brake unit configured to receive the first brake control signal from the primary control unit and generate a first braking force for braking the vehicle based on the received first brake control signal;

a secondary control unit configured to determine a third depression amount based on the depression signal transmitted by the third signal transmission unit and configured to generate a second brake control signal;

a secondary brake unit configured to receive the second brake control signal from the secondary control unit and generate a second braking force for braking the vehicle based on the received second brake control signal; and a monitoring communication unit configured to:
- receive the first and second depression amounts from the primary control unit;
- receive the third depression amount from the secondary control unit;
- transmit the received first and second depression amounts to the secondary control unit; and
- transmit the third depression amount to the primary control unit;

a fourth signal transmission unit configured to transmit the depression signal generated by the second pedal stroke sensor, wherein the secondary control unit is further configured to determine a fourth depression amount based on the depression signal transmitted by the fourth signal transmission unit, and wherein the primary control unit is further configured to:
- detect that a sum of the third and fourth depression amounts is not within a predetermined range; and
- brake the vehicle based on the first or second depression amount.

* * * * *